US012509176B2

(12) United States Patent
Broadbent et al.

(10) Patent No.: US 12,509,176 B2
(45) Date of Patent: Dec. 30, 2025

(54) LATCH MECHANISM

(71) Applicant: Tailfin Limited, Bristol (GB)

(72) Inventors: Nicholas Broadbent, Long Ashton North (GB); Robert Phillips, Bristol (GB)

(73) Assignee: TAILFIN LIMITED, Bristol (GB)

( * ) Notice: Subject to any disclaimer, the term of this patent is extended or adjusted under 35 U.S.C. 154(b) by 166 days.

(21) Appl. No.: 18/426,978

(22) Filed: Jan. 30, 2024

(65) Prior Publication Data

US 2024/0253722 A1 Aug. 1, 2024

(30) Foreign Application Priority Data

Jan. 31, 2023 (GB) ..................................... 2301402

(51) Int. Cl.

| | |
|---|---|
| ***B62J 9/30*** | (2020.01) |
| ***E05C 5/02*** | (2006.01) |
| ***E05C 19/16*** | (2006.01) |
| *E05C 5/00* | (2006.01) |

(52) U.S. Cl.

CPC .................. *B62J 9/30* (2020.02); *E05C 5/02* (2013.01); *E05C 19/16* (2013.01); *E05C 2005/005* (2013.01)

(58) Field of Classification Search

CPC .... B62J 9/30; E05C 5/02; E05C 19/16; E05C 2005/005

USPC ......................................................... 224/412

See application file for complete search history.

(56) References Cited

U.S. PATENT DOCUMENTS

| | | | | |
|---|---|---|---|---|
| 6,398,272 B1 * | 6/2002 | Plummer | E05C 19/06 292/249 |
| 8,910,819 B2 * | 12/2014 | Seiders | E05B 65/52 220/592.2 |
| 9,834,342 B2 * | 12/2017 | Seiders | B65D 45/20 |
| 10,294,022 B2 * | 5/2019 | Blazer | B65F 1/1615 |
| D880,951 S * | 4/2020 | Jacobsen | D7/605 |

(Continued)

FOREIGN PATENT DOCUMENTS

CN 113951620 1/2022

OTHER PUBLICATIONS

UK Combined Search and Examination Report for Application No. GB2301402.0, UK Intellectual Property Office, Jul. 10, 2023.

*Primary Examiner* — Peter N Helvey

(74) *Attorney, Agent, or Firm* — Perilla Knox & Hildebrandt LLP

(57) ABSTRACT

A latch mechanism for securing together first and second parts of an assembly includes a first latching component comprising a retainer having an engagement surface; a resilient connector connecting the first latching component to the first part and applying a resilient action on the first latching component resisting displacement of the first latching component in a latching direction; and a second latching component comprising a projection having a latching surface and attached to the second part with the projection projecting outwardly from the second part to a free end of the projection. The engagement surface is engageable with the latching surface to prevent displacement of the first latching component relative to the second latching component in a direction opposite to a latching direction. The latch mechanism further comprises a guide surface on the second latching component and a limb provided on the first latching component.

20 Claims, 7 Drawing Sheets

(56) References Cited

U.S. PATENT DOCUMENTS

| | | | | |
|---|---|---|---|---|
| 10,687,606 | B1 * | 6/2020 | Nicks, III | A45F 4/02 |
| 10,843,863 | B2 * | 11/2020 | Morine | B65D 43/16 |
| 11,267,621 | B2 * | 3/2022 | Guerdrum | B65D 81/3813 |
| 11,414,256 | B2 * | 8/2022 | Fabela | B65D 43/164 |
| D985,359 | S * | 5/2023 | Ahlström | D8/331 |
| D995,264 | S * | 8/2023 | Ahlström | D8/331 |
| 2012/0132657 | A1 | 5/2012 | Seiders | |
| 2016/0251124 | A1 | 9/2016 | Arnold et al. | |
| 2017/0020256 | A1 | 1/2017 | Jankura et al. | |
| 2023/0019028 | A1 * | 1/2023 | Tull | B65D 45/16 |

* cited by examiner

STEP 1

STEP 2

STEP 3

STEP 4

LATCH MECHANISM

FIELD OF THE INVENTION

This invention relates to a latch mechanism and is particularly, although not exclusively, concerned with a latch mechanism for use with a luggage carrier, for example a cargo pack suitable for mounting on a bicycle.

BACKGROUND

Bikepacking is a popular leisure pursuit which often involves multi-day touring on a bicycle, often an off-road bicycle such as a mountain bike. Everything needed for touring is carried on the bicycle or by the rider. It is known to provide cargo packs in the form of receptacles made from a rigid or semirigid material, such as a stiff fabric, which can be mounted on the frame of a bicycle. Such cargo packs may include a lid which can be raised to provide access to the interior of the body of the cargo pack.

A means of fastening the lid in the closed position may be provided, but known fastening means tend to be difficult to manipulate. For example, known latching mechanisms require a latching element to be gripped between finger and thumb in order to engage and disengage the latch. This this can be difficult if the rider is wearing gloves, or when the cargo pack in question is not easy to reach when the rider is seated on the bicycle saddle.

SUMMARY

According to the present invention there is provided a latch mechanism for securing together first and second parts of an assembly, the latch mechanism comprising: a first latching component comprising a retainer having an engagement surface; a resilient connector which is configured for connecting the first latching component to the first part of the assembly and for applying a resilient action on the first latching component resisting displacement of the first latching component in a latching direction, the resilient connector acting on the first latching component at a point spaced from the engagement surface in the latching direction; and a second latching component comprising a projection having a latching surface and being configured for attachment to the second part of the assembly with the projection projecting outwardly from the second part of the assembly to a free end of the projection, the first and second latching components being releasably engageable with each other to resist separation of the first and second parts. The engagement surface is engageable with the latching surface to prevent displacement of the first latching component relative to the second latching component in a direction opposite to a latching direction under the action of the resilient connector. The latch mechanism further comprises: a guide surface on the second latching component configured for guiding the retainer transversely of the latching direction during movement of the first latching component over the second latching component in the latching direction to engage the retainer with the latching surface; and a limb provided on the first latching component and extending away from the retainer in a direction opposite the latching direction, the limb having a free end remote from the retainer whereby during disengagement of the first latching component from the second latching component the first latching component pivots about the free end of the limb to cause the retainer to ride over the free end of the projection.

The latching surface may face in the latching direction and may be inclined to the latching direction at a latching surface angle which is not greater than 90°.

The latching surface angle may not be less than 20°.

The latching surface angle may not be greater than 60°.

The guide surface may face in a direction opposite the latching direction and may be inclined to the latching direction at a guide surface angle which is not greater than 40°.

The guide surface angle may be less than the latching surface angle.

A convex arcuate transition surface may be provided at the free end of the projection.

The projection may be provided with an end surface which may be substantially parallel to the latching direction and may extend between the guide surface and the transition surface.

The retainer on the first latching component may have a cam surface for engagement with the guide surface of the second latching component.

The resilient connector may be a tensile element.

The resilient connector may comprise a resilient cord which extends through a passage provided in the retainer and the or each limb.

The limb may be one of a pair of limbs and the resilient cord may emerge at the free ends of the limbs.

A release tab may be provided on the first latching component for manual release of the first latching component from the second latching component.

The release tab may extend from the retainer in the latching direction.

Magnetic means may be provided for creating magnetic attraction between the first and second latching components.

The magnetic means may comprise permanent magnets provided respectively in the first and second components.

According to another aspect of the present invention there is provided a cargo pack for mounting on a bicycle, the cargo pack comprising two parts constituted respectively by a body configured for accommodating cargo, and a lid for closing the body, the cargo pack further comprising a latch mechanism which comprises: a first latching component comprising a retainer having an engagement surface; a resilient connector which is configured for connecting the first latching component to a first one of the parts and for applying a resilient action on the first latching component resisting displacement of the first latching component in a latching direction, the resilient connector acting on the first latching component at a point spaced from the engagement surface in the latching direction; and a second latching component comprising a projection having a latching surface and being configured for attachment to a second one of the parts with the projection projecting outwardly from the second part to a free end of the projection, the first and second latching components being releasably engageable with each other to resist separation of the first and second parts. The engagement surface is engageable with the latching surface to prevent displacement of the first latching component relative to the second latching component in a direction opposite to a latching direction under the action of the resilient connector. The latch mechanism further comprises: a guide surface on the second latching component configured for guiding the retainer transversely of the latching direction during movement of the first latching component over the second latching component in the latching direction to engage the retainer with the latching surface; and a limb provided on the first latching component and extending away from the retainer in a direction opposite the latching direction, the limb having a free end remote from the retainer whereby during disengagement of the first latching component from the second latching component the first latching component pivots about the free end of the limb to cause the retainer to ride over the free end of the projection.

The free end of the limb may be engageable with a surface of one of the parts of the cargo pack to provide a fulcrum for pivotal movement of the first latching component to disengage the first latching component from the second latching component.

The limb may be one of a pair of limbs extending from the retainer and the resilient connector may comprise a resilient cord which extends through a passage provided in the retainer and each limb. The cord may emerge at the free ends of the limbs and may be secured to a securing element attached to the first part of the assembly.

The first part may be the lid and the second part may be the body.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
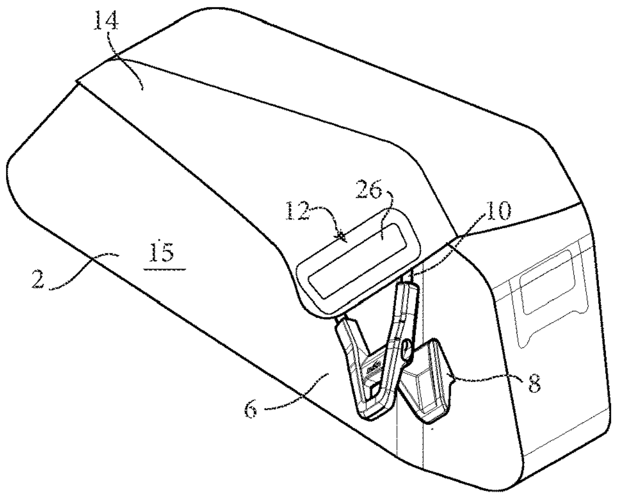
FIG. 1 shows a cargo pack having a lid and a latching mechanism in an unlatched condition.

The cargo pack shown in FIGS. 1 to 4 comprises a body 2 and a lid 4 which may for example, be hinged to the body 2 along a hinge line on the side of the pack opposite that visible in FIGS. 1 to 4. First and second latching components 6 and 8 are secured respectively to the body 2 and the lid 4. The first latching component 6 is provided with a resilient connector 10 in the form of an elastic shock cord which extends between the body of the first latching component 6 and a mounting panel 12 which is affixed to a side panel 14 of the lid 4. The mounting panel 12 comprises a facing plate 26 which provides a flat surface to the exterior of the lid 4, and a securing plate 24 (FIG. 5) on its inner face which enables the shock cord 10 to be installed in the mounting panel 12 in a secure yet replaceable manner.

The second latching component 8 is secured to a side wall 15 of the body 2 by any suitable manner, such as welding, adhesive bonding or stitching.

Figure 2:
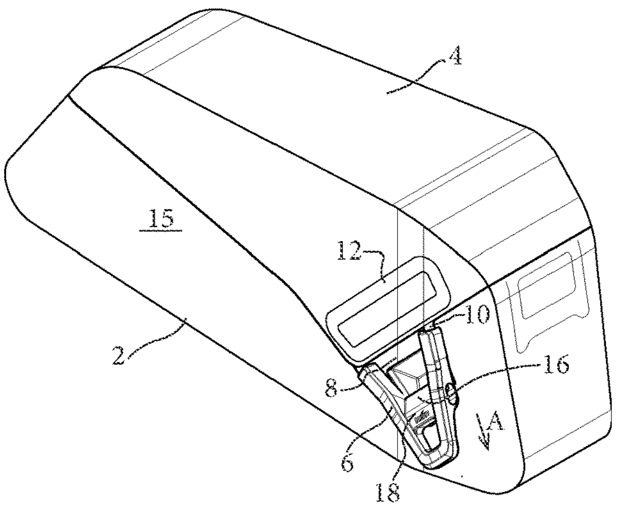
FIG. 2 corresponds to FIG. 1 but shows the latching mechanism in an intermediate condition.

In FIG. 1, the latching mechanism comprising the latching components 6 and 8 is shown in the unlatched condition, allowing the lid 4 to be hinged away from the body 2 to provide access to the interior of the cargo pack. In FIG. 2, the first latching component 6 is shown overlying the second latching component 8. Displacement of the first latching component 6 in a latching direction A downwards and to the right as seen in FIG. 2 is resisted by the shock cord 10. The latching direction A is defined as the direction, parallel to the side wall 15, in which the first latching component 6 has to be moved against the tension of the shock cord 10 in order to engage the first latching component 6 with the second latching component 8, as will be described below.

Figure 3:
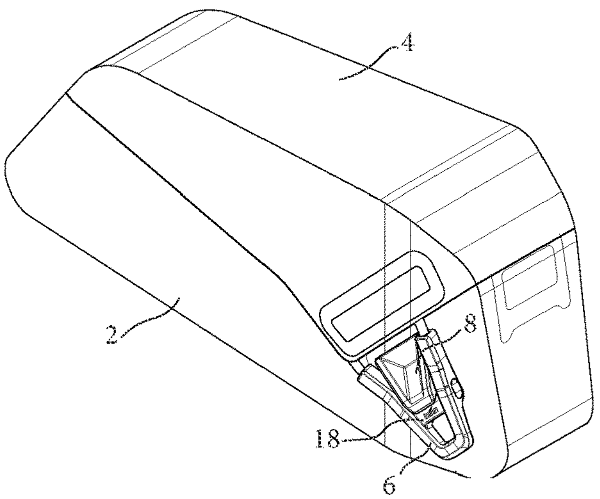
FIG. 3 corresponds to FIGS. 1 and 2 but shows the latching mechanism in a latched condition.
Figure 16:
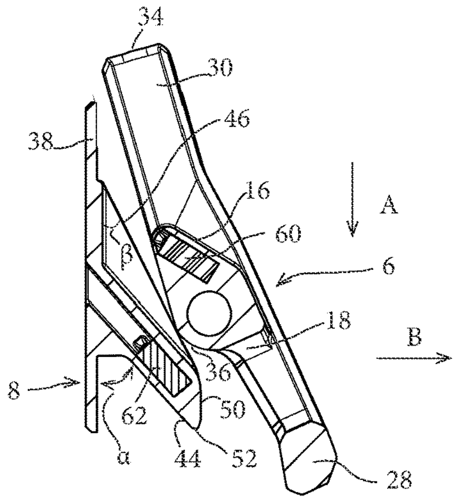
FIG. 16 corresponds to FIG. 15 but shows an intermediate condition during movement from the unlatched to the latched condition.

Pressure applied to the first latching component 6 in the latching direction A, for example at an engagement surface 16 on a retainer 18 of the first latching component 6, can overcome the tension applied by the shock cord 10 to enable the first latching component 6 to travel over the second latching component 8 to a latched condition shown in FIG. 3. In this condition, the engagement surface 16 engages a latching surface 44 of the second latching component (see FIG. 16).

Figure 4:
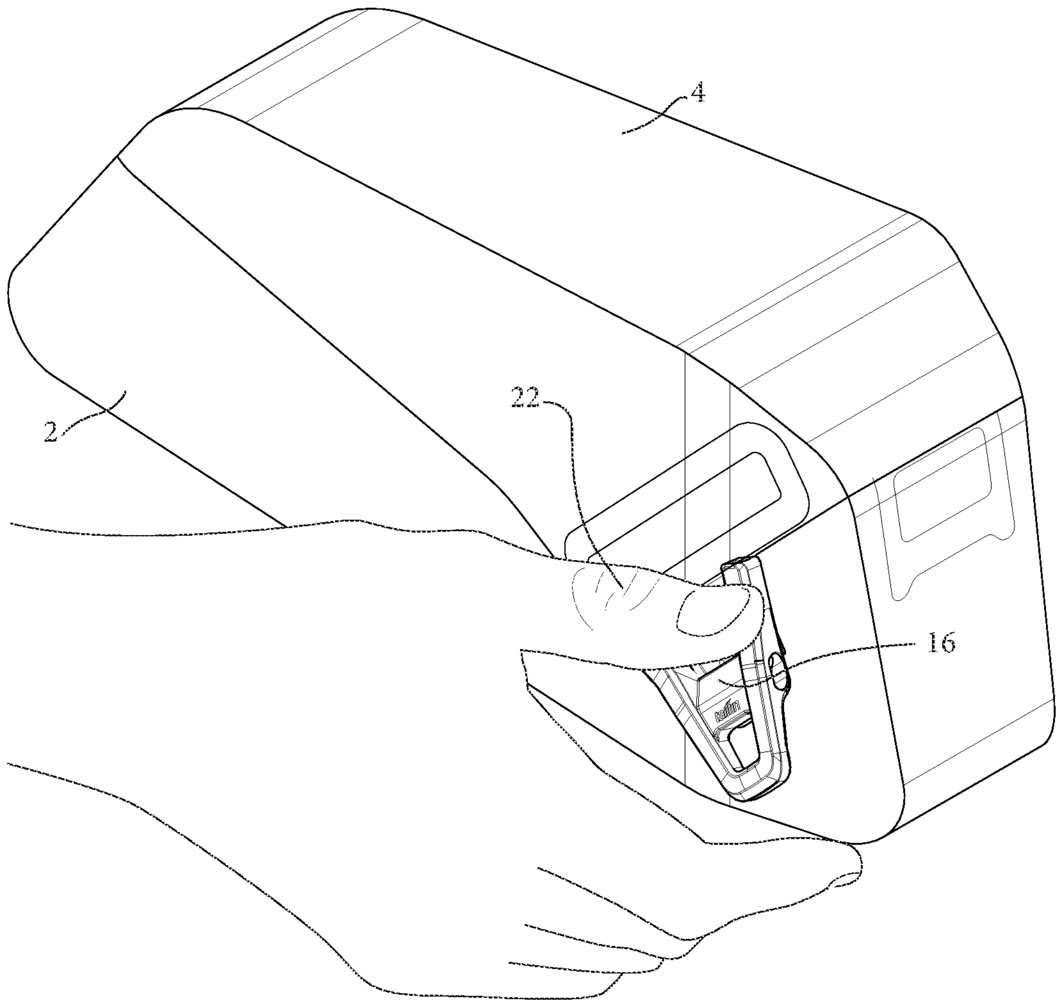
FIG. 4 corresponds to FIG. 2 but shows a user's hand performing a latching operation.

The required pressure on the retainer 18 of the first latching component 6 may for example, be applied by a user's thumb, as shown in FIG. 4. Thus, a simple pushing action on the first latching component 6 is sufficient to overcome the tension in the shock cord 10 to engage the latching components 6 and 8 so as to retain the lid 4 securely closed on the body 2. Consequently the latching operation is a significantly simpler single action operation compared with known systems where a more complex two-finger (or finger and thumb) pinch grip is required to position an elasticated element properly and then pull it over a hook.

Figure 5:
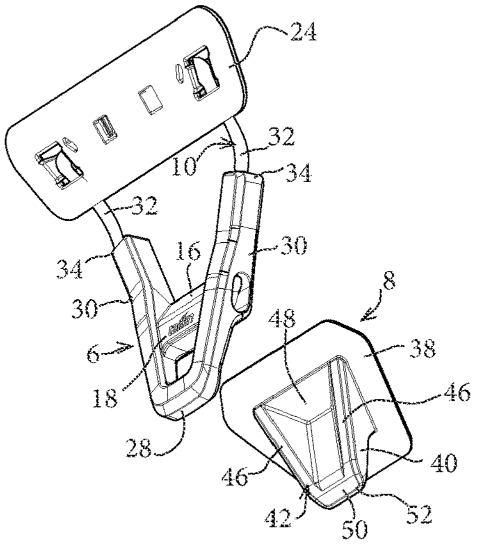
FIG. 5 shows first and second components of the latching mechanism in the unlatched condition.
Figure 6:
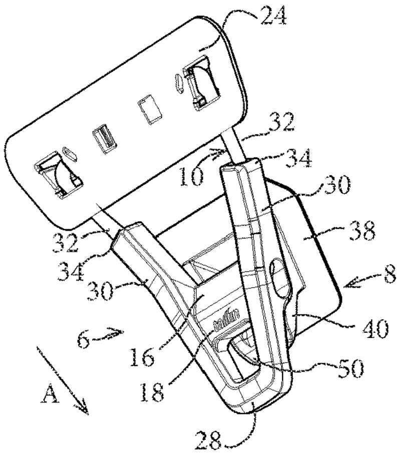
FIG. 6 shows the latching components in the intermediate condition.
Figure 7:
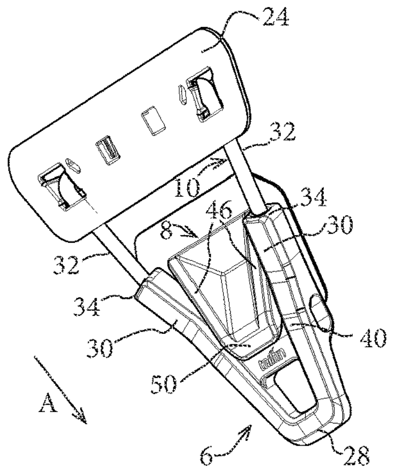
FIG. 7 shows the latching components in the latched condition.

FIGS. 5 to 7 show the first and second latching components 6 and 8 separated from the body 2 and the lid 4 of the pack shown in FIGS. 1 to 4. FIG. 5 shows the shock cord 10 extending into the securing plate 24 which seats against the inside face of the side panel 14 of the lid 4 where it is retained by the facing plate 26 of the mounting panel 12.

The first latching component 6 has a generally V-shaped body providing a release tab 28 from which a pair of limbs 30 extend. The limbs 30 diverge from each other in the direction away from the release tab 28, and the shock cord 10 has two exposed sections 32 which extend between the respective free ends 34 of the limbs 30 and the securing plate 24. The retainer 18 extends between the limbs 30 at a position between the release tab 28 and the free ends 34. In an alternative embodiment, the limbs could be parallel so that the body is generally U-shaped.

The engagement surface 16 of the retainer 18 is a flat surface which extends obliquely of the general plane in which the limbs 30 lie and thus slopes away from the body 2 in the direction towards the release tab 28 in the position shown in FIGS. 1 and 5.

Figure 8:
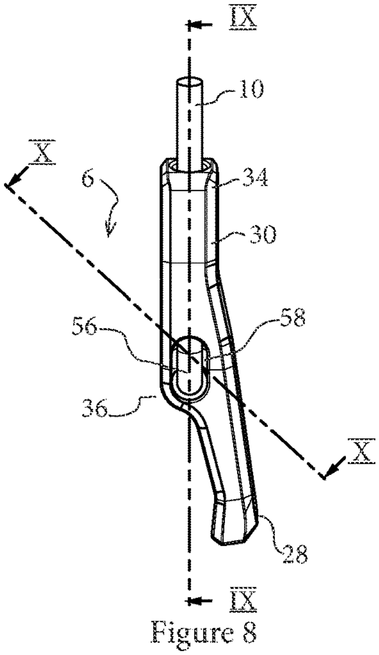
FIG. 8 is a side view of the first latching component.

The surface of the retainer 18 directed towards the side panel 15 as seen in FIG. 1 provides a cam surface 36 (FIG. 8), the function of which will be discussed below.

Figure 11:
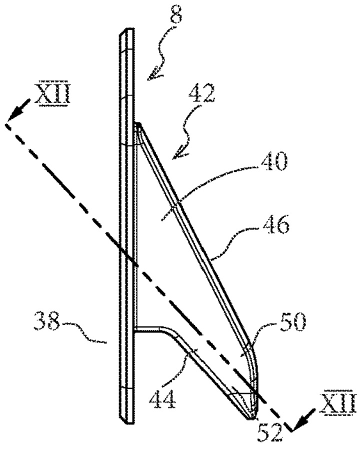
FIG. 11 is a side view of the second latching component.

The second latching component 8 comprises an attachment panel 38 which is secured to the side panel 15 of the body 2. A projection 40 extends outwardly from the attachment panel 38 and is inclined outwardly and away from the lid 4. As shown in FIG. 11, the projection has an outer surface 42 which provides a guide surface for the cam surface 36 of the retainer 18, and an inner surface 44 which provides a latching surface 44 for engagement with the engagement surface 16 of the retainer 18. As will be appreciated from FIG. 5, the guide surface 42 comprises two flat coplanar sections 46 separated by a recess 48. The guide surface sections 46 meet at a common transverse surface 50 which extends parallel to the attachment panel 38 and which meets the latching surface 44 at a transition surface 52. The transition surface 52 is convex with a small radius of curvature.

FIG. 6 shows the first and second latching components 6, 8 in an intermediate condition during a latching operation. In this condition, the lid 4 is closed over the body 2 and the cam surface 36 of the retainer 18 engages the guide surface 42, bridging the two coplanar sections 46. Finger or thumb pressure applied to the engagement surface 16 can move the first latching component 6 downwardly and to the right as seen in FIG. 6, in other words in the latching direction A, against the tension of the shock cord 10. In the condition shown in FIG. 6, the shock cord 10 is taut, or under light tension, and the pressure applied to the engagement surface 16 overcomes this tension so that the retainer 18 is moved over the projection 40, along the guide surface 42. As shown in FIG. 7, this movement eventually takes the rear edge 54 (FIG. 6) of the retainer 18 past the transition surface 52 at the extreme end of the projection 40, allowing the retainer 18 to snap underneath the projection 40. The tension in the shock cord 10 then draws the first latching component 6 in the direction opposite the latching direction A to bring the engagement surface 16 into contact with the latching surface 44 of the second latching component 8.

Figure 9A:
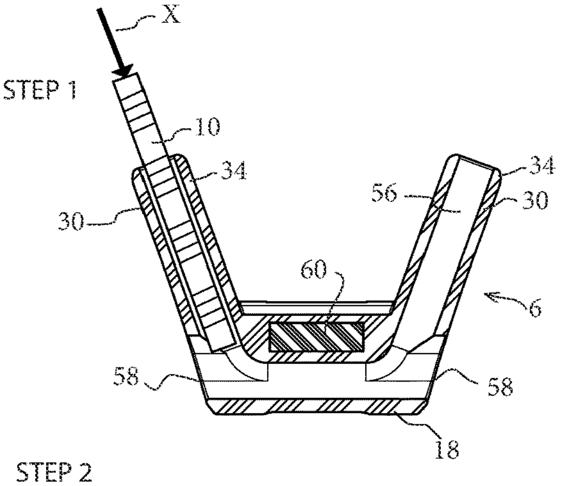
FIGS. 9A-9D are sectional views taken on the line IX-IX in FIG. 8 showing different stages in the insertion of a shock cord into the first latching component.
Figure 9B:
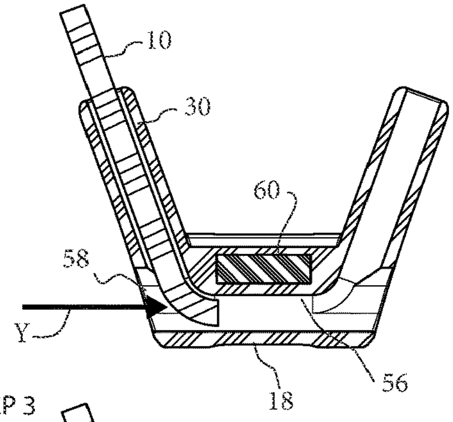
Figure 9C:
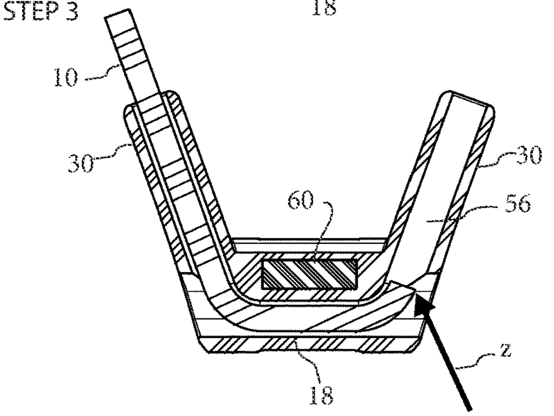
Figure 9D:
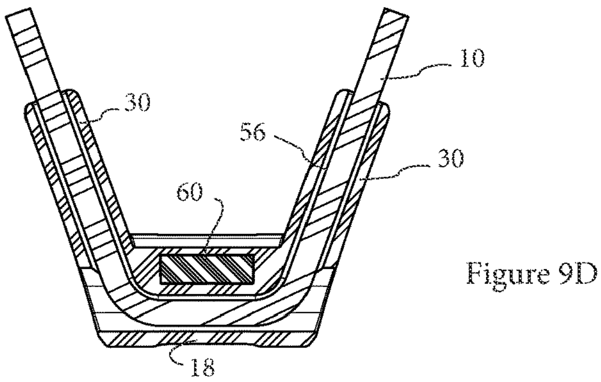

FIGS. 9A to 9B illustrate how the shock cord 10 is installed in the first latching component 6. It will be appreciated that the limbs 30 and the retainer 18 are hollow and so provide a continuous passage 56 which extends down one limb 30, through the retainer 18 and up the other limb 30. The region of the passage 56 passing through the retainer 18 is open at its ends 58. As a result of this construction, it is possible to replace the shock cord 10, for example in the event of breakage, by removing any fragments of the original shock cord and passing an end of the replacement shock cord 10 into the end 34 of one of the limbs 30 as indicated by an arrow X in FIG. 9A and directing the inserted end of the shock cord 10 into the portion of the passage 56 within the retainer 18 by means of an implement introduced through the respective open end 58 as indicated by the arrow Y in FIG. 9B. When the end of the introduced shock cord 10 has reached the opposite end of the retainer 18, it can be directed in a similar manner into the region of the passage 56 in the other of the limbs 30 as indicated by the arrow Z in FIG. 9C. Once fully inserted, as shown in FIG. 9D, the ends of the shock cord 10 can be secured within the securing plate 24 after trimming to length, if required. It will be appreciated that, once the shock cord is installed in the passage 56, it is freely movable in its lengthwise direction along the passage 56. This means that the full length of the loop of the cord 10 extending from the securing plate 24 is available to stretch when the latching component 6 is pushed in the direction A. Consequently, an adequate extension of the cord 10 can be obtained in order to push the retainer 18 over the projection 40 without overstretching the exposed sections 32. If the cord 10 were fixed within the latching component 6 so that the only part that could stretch were the exposed sections 32, those exposed sections 32 would need to be increased in length and the overall latching mechanism would be less compact.

Figure 13:
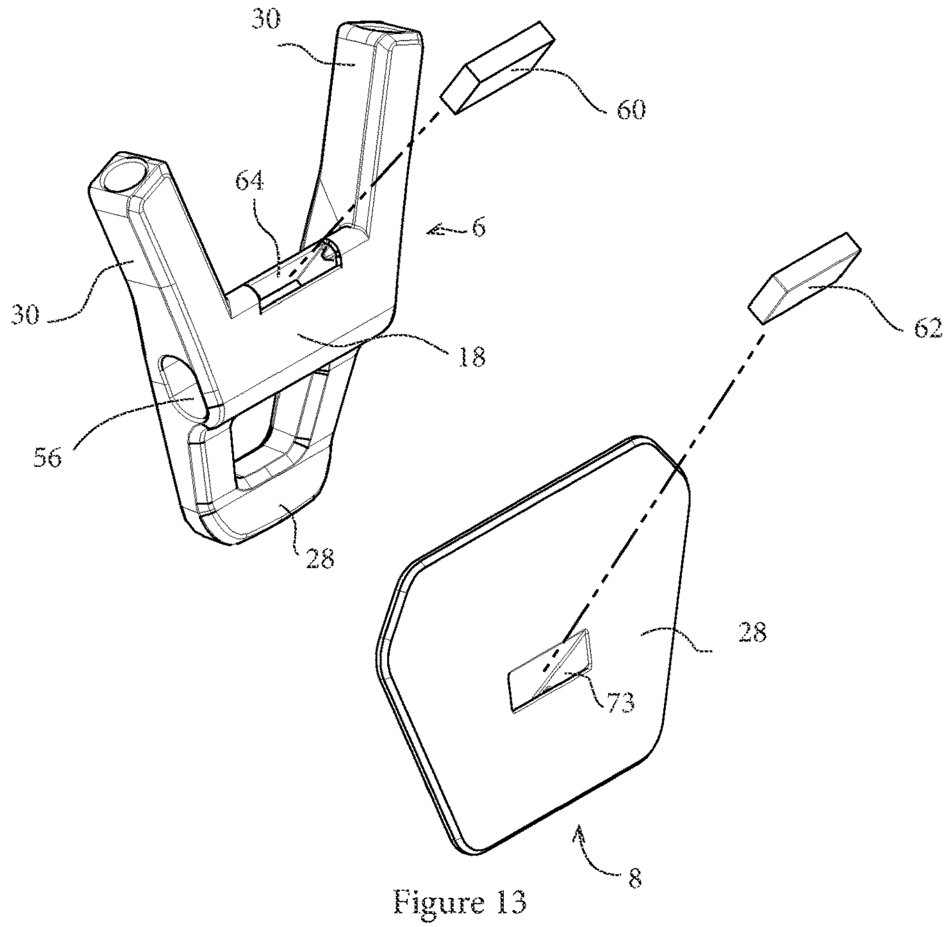
FIG. 13 shows the positioning of magnets in the first and second latching components.
Figure 14:
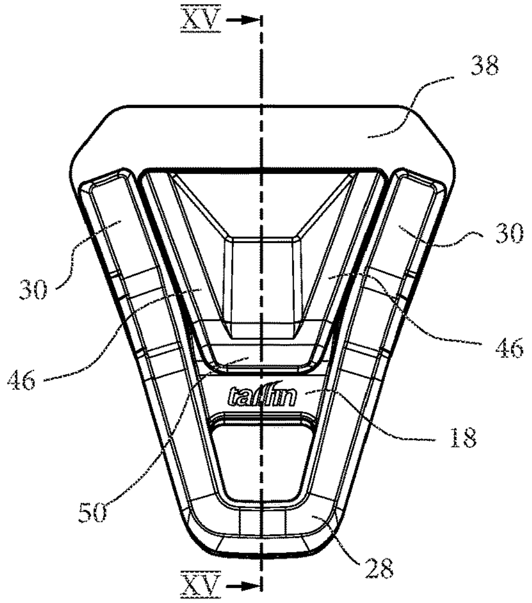
FIG. 14 shows the latching components in the latched condition.
Figure 15:
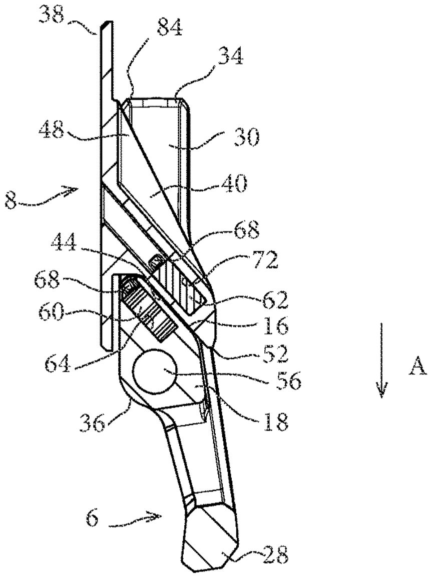
FIG. 15 is a sectional view on the line XV-XV in FIG. 14.

As mentioned, once the latching mechanism is in the latched condition as shown in FIGS. 7 and 14, the retainer 18 will be held firmly in contact with the latching surface 44 under the tension of the shock cord 10. It will be appreciated that the tension in the shock cord acts on the first latching component 6 at the part of the passage 56 passing through the retainer 18. Consequently, as shown in FIG. 15, the force of the shock cord, acting in the direction opposite the latching direction A, presses the engagement surface 16 into contact with the latching surface 44 and so biases the retainer 18 inwardly, i.e. along the latching surface 44 away from the transition surface 52 at the tip of the projection 40. This ensures that, when in the latching condition, the first latching component 6 is held securely by the projection 40 of the second latching component 8. As an optional enhancement of the mechanism, magnetic attraction between the latching components 6 and 8 may be achieved, for example by means of permanent magnets 60, 62 provided respectively in the first and second latching components 6 and 8. This measure is illustrated in FIGS. 10, 12 and 13.

Figure 10:
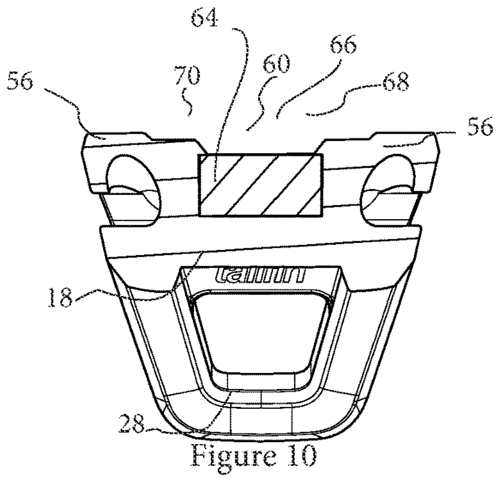
FIG. 10 is a sectional view taken on the line X-X in FIG. 8.

Referring to FIGS. 10 and 13, the retainer 18 of the first latching component 6 has a cavity 64 which is sized to be a close fit around the respective magnet 60 which is of rectangular cross-section. The cavity 64 has an opening 66 at which are provided oppositely disposed barbs 68 having oblique surfaces 70 which slope outwardly of the opening 66 in the direction out of the cavity 64. The resilience of the material of the first latching component 6 allows the magnet 60 to be pressed into the cavity 64 past the barbs 68. Once the magnet 60 is inserted, the barbs 68 return to their initial configuration to retain the magnet 60 in place. This measure avoids the need to mould the magnet 60 into the material of the first latching component 6, which can degrade the properties of the magnet under the heat required.

Figure 12:
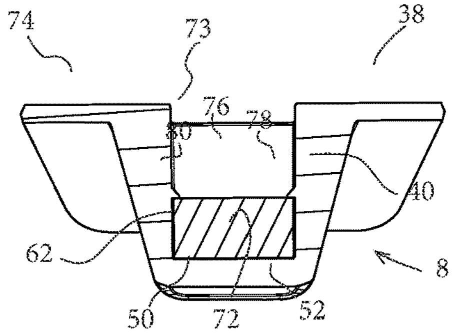
FIG. 12 is a sectional view taken on the line XII-XII in FIG. 11.

A similar arrangement is provided in the second latching component, as shown in FIG. 12. A cavity 72 is provided in the projection 40, situated at the end of a passage 73 extending inwardly of the projection from the contact surface 74 of the attachment panel 38 which contacts the outer surface of the sidewall 15 of the body 2. As with the cavity 64, the cavity 72 in the projection 40 has an entrance 76, and oppositely disposed barbs 78 are provided at the entrance 76. Each barb has an oblique surface 80 which slopes outwardly of the opening 76 in the direction out of the cavity 72. The magnet 62 can thus be inserted securely into the cavity 72 by pressing it past the barbs 78.

FIG. 15 is a sectional view showing the latched position of the latching mechanism, corresponding to that illustrated in FIGS. 3 and 7. In this condition, the magnets 60 and 62, which lie beneath, and close to, the engagement surface 16 and the latching surface 44 respectively attract each other and consequently draw the engagement surface 16 and the latching surface 44 together. This measure resists accidental separation of the latching components 6, 8 and also provides a positive locking action as the latching components 6, 8 engage with one another, accompanied by an audible and tactile "click".

The shapes of the first and second latching components 6, 8 as described above thus provide a simple thumb or finger push on the first latching component 6 in order to engage the latch, and a simple flick of the release tab 28 in order to disengage the latch.

Furthermore, when the latching components 6, 8 are in the intermediate condition shown in FIG. 6 (and also in FIG. 16), the magnets 60, 62 are aligned and positioned close enough to each other to create an attractive force to hold the cam surface 36 in contact with the guide surface 46. Consequently, the first and second latching components 6, 8 are properly positioned with respect to each other in preparation for, and during, movement by hand of the first latching component 6 in the latching direction A, as shown in FIG. 4. Also, in that position, the pack will remain "semi-closed" should it be helpful to have frequent access to the pack (for example when loading or unloading it) without fully latching the pack closed. An additional benefit of the magnets 60, 62 is that, should the shock cord 10 break, the magnets serve to retain the first latching component 6 against the projection 40 of the second latching component 8 so that the first latching component 6 will not be lost, and can be reattached using a replacement shock cord 10, as described above.

Figure 17:
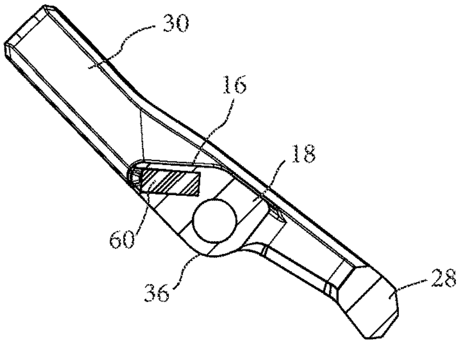
FIG. 17 corresponds to FIG. 15 but shows an intermediate condition during movement from the latched to the unlatched condition.
Figure 17:
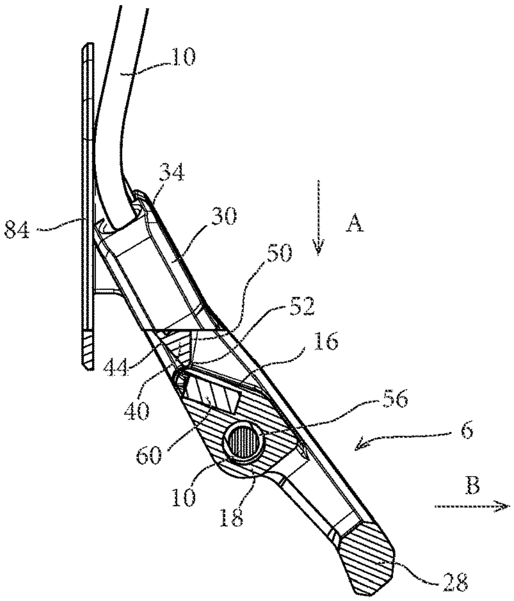
Figure 18:
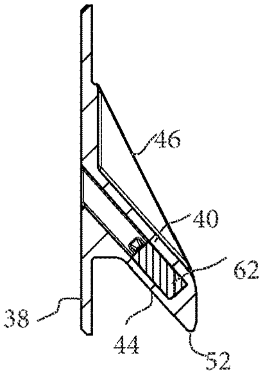
FIG. 18 corresponds to FIG. 15 but shows the unlatched condition.

From the closed condition shown in FIG. 15, the first latching component 6 is released from the second latching component 8 by using one or more fingers to raise the release tab 28 in the direction indicated by an arrow B, that is to move it to the right as shown in FIG. 15, away from the adjacent sidewall 15 of the body 2 to which the second latching component 8 is secured. Raising of the release tab 28 initially pivots the first latching component 6 to bring the ends 34 of the limbs 30 into contact with the attachment panel 38 at a point 84, which serves as a fulcrum for subsequent pivotal movement of the first latching component 6. As shown in FIG. 17, as the first latching component 6 is pivoted with respect to the second latching component 8 about the fulcrum 84 the engagement surface 16 breaks away from face-to-face contact with the latching surface 44, and a camming action between these surfaces causes the first latching component 6 to be displaced in the latching direction A against the tension exerted by the shock cord 10. Eventually, the first latching component 6 will reach the position relative to the projection 40 shown in FIG. 17, at which the edge of the engagement surface 16 away from the release tab 28 passes over the transition surface 52 of the projection 40. At that point, the tension in the shock cord 10, acting at the part of the passage 56 passing through the retainer 18, applies a torque to the first latching component 6 in the anti-clockwise direction, so assisting the pivoting of the first latching component about the point 84 to carry the retainer 18 past the transition surface 52 at the tip of the projection 40. The tension in the cord 10 then pulls the first latching component 6 in the direction opposite to the latching direction A, taking the first and second latching components 6, 8 to the released condition shown in FIG. 18, allowing the lid 4 to be raised from the body 2 of the cargo pack.

The shock cord 10 is a loose fit in the passage 56, and so, as mentioned above, the tension applied by the shock cord 10 to the first latching component 6 is applied to the retainer 18 in the section of the passage 56 passing through the retainer 18. As a result, the mechanism has an over centre action, with the first latching component 6 being biased by the shock cord 10 towards the latched condition while the section of the passage 56 running through the retainer 18 is situated on the pack side of the transition surface 52 (i.e. to the left of the transition surface 52 as seen in FIG. 15), while the latching component 6 is biased by the shock cord 10 away from the latched condition when the section of the passage 56 running through the retainer 18 is situated to the right of the transition surface 52. This action contributes to a positive action between the latched and unlatched conditions providing a tactile indication of the transition from one condition to the other.

It will be appreciated that the permanent magnets 60, 62 are not essential to the operation of the latch mechanism as described above. However, the magnets provide or enhance a tactile or haptic effect, accompanied by an audible click, when the latch mechanism is engaged or disengaged. This enables the user to determine clearly whether or not a latching or un-latching operation has been completed properly.

Variations of the profiles of the first and second latching components 6, 8, and in particular of the retainer 18 and the projection 40 are possible while retaining the operational benefits as described. It will be appreciated that the angles of the latching surface 44 and the engagement surface 16 can affect the ease with which the latch mechanism can be released, while retaining secure latching during normal use. It is considered that the angle $\alpha$ that the latching surface 44 makes with the mounting panel 38 (and consequently with the latching direction A) should preferably be not less than 20° and not more than 60°, although other angles, up to 90°, may provide satisfactory operation. In the embodiment shown in the drawings, the angle $\alpha$ is 42°. Similarly, the angle $\beta$ needs to be small enough to permit easy sliding of the first latching component over the projection 40 in the latching direction A while providing adequate displacement in the direction B to enable the first latching component 6 to ride over the projection 40. In one embodiment, the angle $\beta$ is 27°, but it could be a different angle, for example in the range 20° to 40°.

Also, the length of the limbs 30 is important in determining the force needed on the release tab 28 in the direction B in order to release the latch mechanism. Thus, during the release movement, the force applied at the interface between the latching and engagement surfaces 44, 16 must have a component directed along the latching service 44 in the direction towards its tip at the transition surface 52. If the length of the limbs 30 is too short, the direction of the force applied at that interface may approach 90°, in which case sliding of the latching and engagement surfaces over one another under the action of the tab 28 may become impossible without applying an additional force to the release tab 28 in the latching direction A. As an example, with the angles $\alpha$ and $\beta$ being 42° and 27° respectively, the length of the arms from the edge of the retainer 18 away from the tab 28 to the free end 34, measured in the latching direction A, may be from 14 to 20 mm, for example 16 mm. Also, the length of the projection 40 may be approximately 14 mm, for example with a component in the latching direction A of 10 to 15 mm (e.g. 12 mm), and a component normal to the latching direction A (i.e. in the direction B) of 7 to 11 mm (e.g. 9 mm).

For the avoidance of doubt, the present application extends to the subject-matter described in the following numbered Statements:

Statement 1. A latch mechanism for securing together first and second parts of an assembly, the latch mechanism comprising first and second latching components, the first latching component having a resilient connector for connecting the first latching component to the first part of the assembly, and the second latching component comprising a projection and being configured for attachment to the second part of the assembly with the projection projecting outwardly from the second part of the assembly, the first and second latching components being releasably engageable with each other to resist separation of the first and second parts, the first latching component comprising a retainer for engagement with a latching surface on the projection of the second latching component to prevent displacement of the first latching component relative to the second latching component in a direction opposite to a latching direction under the action of the resilient connector, and the second latching component having a guide surface for guiding the retainer transversely of the latching direction during movement of the first latching component over the second latching component in the latching direction to engage the retainer with the latching surface.

Statement 2. A latch mechanism as in Statement 1, in which the latching surface faces in the latching direction and is inclined to the latching direction at an angle not greater than 90°.

Statement 3. A latch mechanism as in Statement 2, in which the latching surface is inclined to the latching direction at an angle not less than 20°.

Statement 4. A latch mechanism as in Statement 2 or 3, in which the latching surface is inclined to the latching direction at an angle not greater than 60°.

Statement 5. A latch mechanism as in any one of the preceding Statements, in which the guide surface faces in a direction opposite the latching direction and is inclined to the latching direction at an angle not greater than 40°

Statement 6. A latch mechanism as in Statement 5, in which the guide surface is inclined to the latching direction at an angle which is less than the angle at which the latching surface is inclined to the latching direction.

Statement 7. A latch mechanism as in any one of the preceding Statements, in which a convex arcuate transition surface is provided at the free end of the projection.

Statement 8. A latch mechanism as in Statement 7, in which the projection is provided with an end surface which is substantially parallel to the latching direction and extends between the guide surface and the transition surface.

Statement 9. A latch mechanism as in any one of the preceding Statements, in which the retainer on the first latching component has a cam surface for engagement with the guide surface of the second latching component.

Statement 10. A latch mechanism as in any one of the preceding Statements, in which the retainer comprises an engagement surface for engagement with the latching surface of the second latching component.

Statement 11. A latch mechanism as in any one of the preceding Statements, in which the resilient connector is a tensile element.

Statement 12. A latch mechanism as in Statement 10 or in Statement 11 when appendant to Statement 10, in which the resilient connector acts on the first latching component at a point spaced from the engagement surface in the latching direction.

Statement 13. A latch mechanism as in any one of the preceding Statements, in which the first latching component has a limb extending away from the retainer in a direction opposite the latching direction.

Statement 14. A latch mechanism as in Statement 13, in which the limb is one of a pair of limbs.

Statement 15. A latch mechanism as in Statement 14, in which the resilient connector comprises a resilient cord which extends through a passage provided in the retainer and the or each limb.

Statement 16. A latch mechanism as in Statement 16, in which the resilient cord emerges at the free ends of the limbs.

Statement 17. A latch mechanism as in Statement 16, in which the free ends of the resilient cord are secured to a securing element configured for attachment to the first part of the assembly.

Statement 18. A latch mechanism as in any one of the preceding Statements, in which a release tab is provided on the first latching component for manual release of the first latching component from the second latching component.

Statement 19. A latch mechanism as in Statement 18, in which the release tab extends from the retainer in the latching direction.

Statement 20. A latch mechanism as in Statement 13 or in any one of Statements 14 to 19 when appendant to Statement 13, in which the free end of the or each limb is engageable with a surface of the assembly to provide a fulcrum for pivotal movement of the first latching component to disengage the first latching component from the second latching component.

Statement 21. A latch mechanism as in any one of the preceding Statements, in which magnetic means is provided for creating magnetic attraction between the first and second latching components.

Statement 22. A latch mechanism as in Statement 21, in which the magnetic means comprises permanent magnets provided respectively in the first and second components.

Statement 23. A latch mechanism as in Statement 22, in which the permanent magnets are situated within the retainer and the projection.

Statement 24. A latch mechanism for securing together first and second parts of an assembly, the latch mechanism comprising first and second latching components, the first latching component having a resilient connector for connecting the first latching component to the first part of the assembly, and the second latching component comprising a projection and being configured for attachment to the second part of the assembly with the projection projecting outwardly from the second part of the assembly, the first and second latching components being releasably engageable with each other to resist separation of the first and second parts, the first latching component comprising a retainer for engagement with the projection of the second latching component to prevent displacement of the first latching component relative to the second latching component in a direction opposite to a latching direction under the action of the resilient connector, the first latching component having a limb extending away from the retainer in a direction opposite the latching direction and a release tab which extends from the retainer in the latching direction for manual release of the first latching component from the second latching component whereby during release the first latching component pivots about a free end of the limb to cause the retainer to ride over the free end of the projection.

Statement 25. A cargo pack for mounting on a bicycle, provided with a latch mechanism as in any one of the preceding Statements for securing a lid on a body of the cargo pack.

The invention claimed is:

1. A latch mechanism for securing together first and second parts of an assembly, the latch mechanism comprising:

a first latching component comprising a retainer having an engagement surface, a resilient connector which is configured for connecting the first latching component to the first part of the assembly and for applying a resilient action on the first latching component resisting displacement of the first latching component in a latching direction, the resilient connector acting on the first latching component at a point spaced from the engagement surface in the latching direction, a second latching component comprising a projection having a latching surface and being configured for attachment to the second part of the assembly with the projection projecting outwardly from the second part of the assembly to a free end of the projection, the first and second latching components being releasably engageable with each other to resist separation of the first and second parts, the engagement surface being engageable with the latching surface to prevent displacement of the first latching component relative to the second latching component in a direction opposite to a latching direction under the action of the resilient connector, the latch mechanism further comprising:

a guide surface on the second latching component configured for guiding the retainer transversely of the latching direction during movement of the first latching component over the second latching component in the latching direction to engage the retainer with the latching surface, a limb provided on the first latching component and extending away from the retainer in a direction opposite the latching direction, the limb having a free end remote from the retainer whereby during disengagement of the first latching component from the second latching component the first latching component pivots about the free end of the limb to cause the retainer to ride over the free end of the projection.

2. A latch mechanism in accordance with claim 1, wherein the latching surface faces in the latching direction and is inclined to the latching direction at a latching surface angle which is not greater than 90°.

3. A latch mechanism in accordance with claim 2, wherein the latching surface angle is not less than 20°.

4. A latch mechanism in accordance with claim 2, wherein the latching surface angle is not greater than 60°.

5. A latch mechanism in accordance with claim 1, wherein the guide surface faces in a direction opposite the latching direction and is inclined to the latching direction at a guide surface angle which is not greater than 40°.

6. A latch mechanism in accordance with claim 5, wherein the guide surface angle is less than the latching surface angle.

7. A latch mechanism in accordance with claim 1, wherein a convex arcuate transition surface is provided at the free end of the projection.

8. A latch mechanism in accordance with claim 7, wherein the projection is provided with an end surface which is substantially parallel to the latching direction and extends between the guide surface and the transition surface.

9. A latch mechanism in accordance with claim 1, wherein the retainer on the first latching component has a cam surface for engagement with the guide surface of the second latching component.

10. A latch mechanism in accordance with claim 1, wherein the resilient connector is a tensile element.

11. A latch mechanism in accordance with claim 1, wherein the resilient connector comprises a resilient cord which extends through a passage provided in the retainer and the or each limb.

12. A latch mechanism in accordance with claim 11, wherein the limb is one of a pair of limbs and wherein the resilient cord emerges at the free ends of the limbs.

13. A latch mechanism in accordance with claim 1, wherein a release tab is provided on the first latching component for manual release of the first latching component from the second latching component.

14. A latch mechanism in accordance with claim 13, wherein the release tab extends from the retainer in the latching direction.

15. A latch mechanism in accordance with claim 1, wherein magnetic means is provided for creating magnetic attraction between the first and second latching components.

16. A latch mechanism in accordance with claim 15, wherein the magnetic means comprises permanent magnets provided respectively in the first and second components.

17. A cargo pack for mounting on a bicycle, the cargo pack comprising two parts constituted respectively by a body configured for accommodating cargo, and a lid for closing the body, the cargo pack further comprising a latch mechanism which comprises:

a first latching component comprising a retainer having an engagement surface, a resilient connector which is configured for connecting the first latching component to a first one of the parts and for applying a resilient action on the first latching component resisting displacement of the first latching component in a latching direction, the resilient connector acting on the first latching component at a point spaced from the engagement surface in the latching direction, a second latching component comprising a projection having a latching surface and being configured for attachment to a second one of the parts with the projection projecting outwardly from the second part to a free end of the projection, the first and second latching components being releasably engageable with each other to resist separation of the first and second parts, the engagement surface being engageable with the latching surface to prevent displacement of the first latching component relative to the second latching component in a direction opposite to a latching direction under the action of the resilient connector, the latch mechanism further comprising:

a guide surface on the second latching component configured for guiding the retainer transversely of the latching direction during movement of the first latching component over the second latching component in the latching direction to engage the retainer with the latching surface, a limb provided on the first latching component and extending away from the retainer in a direction opposite the latching direction, the limb having a free end remote from the retainer whereby during disengagement of the first latching component from the second latching component the first latching component pivots about the free end of the limb to cause the retainer to ride over the free end of the projection.

18. A cargo pack in accordance with claim 17, wherein the free end of the limb is engageable with a surface of one of the parts of the cargo pack to provide a fulcrum for pivotal movement of the first latching component to disengage the first latching component from the second latching component.

19. A cargo pack in accordance with claim 18, wherein the limb is one of a pair of limbs extending from the retainer and wherein the resilient connector comprises a resilient cord which extends through a passage provided in the retainer and each limb, the cord emerging at the free ends of the limbs and being secured to a securing element attached to the first part of the assembly.

20. A cargo pack in accordance with claim 17, wherein the first part is the lid and the second part is the body.

* * * * *